US008543990B2

(12) United States Patent
McGuire et al.

(10) Patent No.: US 8,543,990 B2
(45) Date of Patent: Sep. 24, 2013

(54) METHODS AND APPARATUS FOR TESTING SOFTWARE WITH REAL-TIME SOURCE DATA FROM A PROJECTILE

(75) Inventors: Patric M. McGuire, Prosper, TX (US); Steven T. Siddens, McKinney, TX (US); David A. Lance, Plano, TX (US)

(73) Assignee: Raytheon Company, Waltham, MA (US)

( * ) Notice: Subject to any disclaimer, the term of this patent is extended or adjusted under 35 U.S.C. 154(b) by 953 days.

(21) Appl. No.: 12/152,647

(22) Filed: May 14, 2008

(65) Prior Publication Data

US 2008/0288927 A1   Nov. 20, 2008

Related U.S. Application Data

(60) Provisional application No. 60/917,743, filed on May 14, 2007.

(51) Int. Cl.
| | | |
|---|---|---|
| *G06F 9/44* | (2006.01) | |
| *G06F 7/00* | (2006.01) | |
| *G06F 17/00* | (2006.01) | |
| *G06F 7/60* | (2006.01) | |
| *G06F 9/45* | (2006.01) | |
| *G06F 7/52* | (2006.01) | |
| *G06F 19/00* | (2011.01) | |
| *H04B 15/00* | (2006.01) | |
| *F41J 5/00* | (2006.01) | |

(52) U.S. Cl.
USPC .......... 717/135; 700/83; 701/1; 701/16; 702/122; 702/189; 703/2; 703/22; 703/23; 708/622; 235/403; 273/372

(58) Field of Classification Search
None
See application file for complete search history.

(56) References Cited

U.S. PATENT DOCUMENTS

| | | | | |
|---|---|---|---|---|
| 4,117,538 A | * | 9/1978 | Shrader et al. | 702/189 |
| 4,935,881 A | * | 6/1990 | Lowenson et al. | 702/122 |
| 5,971,275 A | * | 10/1999 | Leduc et al. | 235/403 |
| 5,971,580 A | * | 10/1999 | Hall et al. | 700/83 |
| 6,109,614 A | * | 8/2000 | Ciarcia | 273/372 |
| 6,298,318 B1 | * | 10/2001 | Lin | 703/23 |
| 6,529,794 B1 | * | 3/2003 | Storck et al. | 700/177 |

(Continued)

OTHER PUBLICATIONS

Purdy et al., Radar Signal Processing [online], 2000, Lincoln Laboratory Journal, vol. 12, No. 2 [Retreived on Oct. 12, 2011]. Retrieved from the internet: <URL: http://www.ll.mit.edu/publications/journal/pdf/vol12_no2/12_2radarsignalprocessing.pdf. pp. 297-320.*

(Continued)

*Primary Examiner* — Don Wong
*Assistant Examiner* — Anibal Rivera
(74) *Attorney, Agent, or Firm* — Schwegman Lundberg & Woessner, P.A.

(57) ABSTRACT

Methods and apparatus for testing software with real-time source data from a projectile according to various aspects of the present invention operate in conjunction with a real-time data source, a signal processor, a recordable medium, and a testing platform. The signal processor receives real-time data from a real-time data source during a test and saves it to a storage medium before providing the real-time data to the testing platform for permanent storage. During a subsequent test, the testing platform may upload the saved real-time data to the signal processor foregoing the need to generate new real-time data from the real-time data source.

13 Claims, 3 Drawing Sheets

(56) References Cited

U.S. PATENT DOCUMENTS

| | | | |
|---|---|---|---|
| H2099 H | 4/2004 | Heydlauff et al. | |
| 2001/0052089 A1 | 12/2001 | Gustavsson et al. | |
| 2002/0004809 A1* | 1/2002 | Golliver et al. | 708/622 |
| 2002/0128806 A1* | 9/2002 | Anderson et al. | 703/2 |
| 2003/0093187 A1* | 5/2003 | Walker | 701/1 |
| 2004/0088602 A1 | 5/2004 | Cohen et al. | |
| 2004/0193789 A1 | 9/2004 | Rudolf | |
| 2005/0007272 A1* | 1/2005 | Smith et al. | 342/189 |
| 2005/0065682 A1* | 3/2005 | Kapadia et al. | 701/35 |
| 2005/0187677 A1* | 8/2005 | Walker | 701/16 |
| 2006/0059387 A1 | 3/2006 | Swoboda et al. | |
| 2006/0212769 A1 | 9/2006 | Saito et al. | |
| 2007/0010985 A1* | 1/2007 | Anderson et al. | 703/22 |

OTHER PUBLICATIONS

K. H. (Kane) Kim et al., A Real-Time Object Model RTO.k and an Experimental Investigation of Its Potentials, IEEE 1994, [Retrieved on Apr. 2, 2013]. Retrieved from the internet: <URL: http://ieeexplore.ieee.org/stamp/stamp.jsp?tp=&arnumber=342772> 11 Pages (392-402).*

Sang H. Son et al., An Integrated Real-Time Locking Protocol, IEEE Feb. 1992, [Retrieved on Apr. 2, 2013]. Retrieved from the internet: <URL: http://ieeexplore.ieee.org/stamp/stamp.jsp?tp=&arnumber=213156&tag=1> 8 Pages (527-534).*

"European Application Serial No. 08754469.8, Office Action mailed Jan. 27, 2010", 1 pg.

"European Application Serial No. 08754469.8, Office Action mailed Dec. 22, 2009", 2 pgs.

"Israel Application Serial No. 201698, Amended Claims filed Dec. 26, 2012", 7 pgs.

"European Application Serial No. 08754469,8, Supplementary European Search Report mailed Aug. 24, 2012", 6 pgs.

"International Application Serial No. PCT/US2008/006183, International Preliminary Report on Patentability dated Nov. 17, 2009", 5 pgs.

"International Application Serial No. PCT/US2008/006183, Written Opinion mailed Sep. 2, 2008", 4 pgs.

"European Application Serial No. 08754469.8, Response filed Mar. 7, 2013 to Office Action mailed Sep. 11, 2012", 12 pgs.

"Israel Application Serial No. 201698, Office Action mailed May 26, 2013", 3 pgs (With Translation).

* cited by examiner

METHODS AND APPARATUS FOR TESTING SOFTWARE WITH REAL-TIME SOURCE DATA FROM A PROJECTILE

CROSS-REFERENCES TO RELATED APPLICATIONS

This application claims the benefit of U.S. Provisional Patent Application No. 60/917,743, filed May 14, 2007, and incorporates the disclosure of the application by reference.

BACKGROUND OF INVENTION

Software development typically involves writing, debugging, and testing computer code. Traditional methods of testing software include supplying the computer code with a set of synthetic data which produce a known result if the software is functioning correctly. When the software produces unexpected or undesired results, the computer code may be changed or modified accordingly. Alternatively, new features may be added to the software which also require testing before the software may be released for use. This is an iterative process that eventually results in computer code that functions as designed.

Some software applications, however, require real-time data that must be generated each time the software is to be tested. In these instances, synthetic data may not adequately reflect the actual conditions in which the software is expected to perform. For example, in applications such as the tracking of high speed projectiles, synthetic data may not be able to replicate environmental conditions or the actual trajectory of the projectile while in flight. Achieving a compliant software package may therefore require multiple range/field tests in which a projectile has to be fired or launched under conditions reflective of the expected environment and may increase development time or development costs.

SUMMARY OF THE INVENTION

Methods and apparatus for testing software with real-time source data from a projectile according to various aspects of the present invention operate in conjunction with a real-time data source, a signal processor, a recordable medium, and a testing platform. The signal processor receives real-time data from a real-time data source during a test and saves it to a storage medium before providing the real-time data to the testing platform for permanent storage. During a subsequent test, the testing platform may upload the saved real-time data to the signal processor foregoing the need to generate new real-time data from the real-time data source.

BRIEF DESCRIPTION OF THE DRAWINGS

A more complete understanding of the present invention may be derived by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present invention.

DETAILED DESCRIPTION OF EXEMPLARY EMBODIMENTS

The present invention may be described in terms of functional block components and various processing steps. Such functional blocks may be realized by any number of hardware or software components configured to perform the specified functions and achieve the various results. For example, the present invention may employ various computers, networks, servers, databases, and the like, which may carry out a variety of functions. In addition, the present invention may be practiced in conjunction with any number of networks, storage media, or real-time data sources, and the systems described are merely exemplary applications for the invention. Further, the present invention may employ any number of conventional techniques for transferring data, calculating information, presenting information, storing information, and the like.

Figure 1:
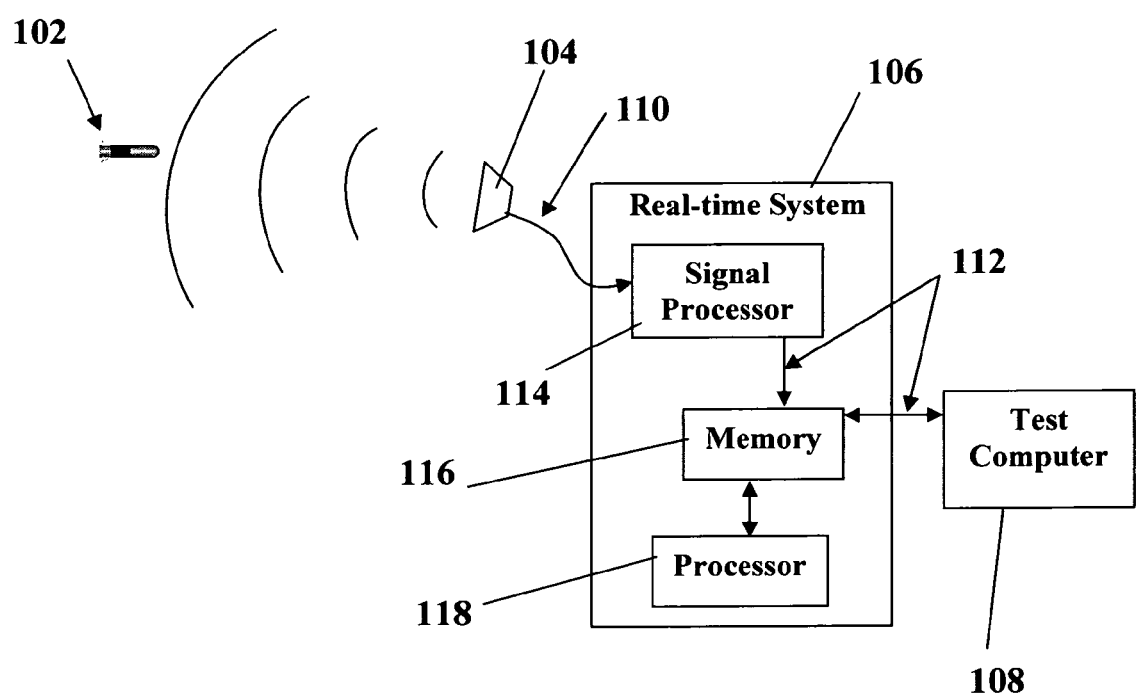
FIG. 1 representatively illustrates a projectile tracking system.

Methods and apparatus for testing software according to various aspects of the present invention operate in conjunction with a computer connected to real-time data source, such as a radar system. The computer may be configured to convert the real-time data source into a signal capable of being used to test software. For example, referring to FIG. 1, a real-time system 106 according to various aspects of the present invention operates in conjunction with a real-time data source 104 configured to provide real-time information relating to a projectile 102. The real-time data source 104 provides an input signal of real-time data 110 to the signal processor 114 that is processed and used to test a software package. The real-time data 110 may be stored temporarily to memory 116 before being transferred to a test computer 108 for permanent storage. Saved real-time data 110 may then be passed to the real-time system processor 118 for testing of a software package.

The projectile 102 comprises a target, for example to a system to deliver a payload. The projectile 102 may comprise any system such as a missile, a rocket, or a ballistically launched artillery shell. The projectile 102 may be guided or unguided and may comprise any suitable material such as lead, steel, or explosive elements. In an exemplary embodiment, the projectile 102 comprises a rocket propelled grenade ("RPG").

The real-time data source 104 generates real-time data 110 information relating to the projectile 102. The real-time data source 104 may comprise any system for gathering real-time projectile 102 data such as a radar system, an infrared tracking system, a laser tracking system, or the like. The real-time data source 104 may comprise a single method or multiple methods of collecting real-time data 110. For example, in one embodiment of the present invention, the real-time data source 104 may comprise a radar system configured to produce projectile 102 track data relating to velocity vectors and directional motion of the projectile 102 after it is fired.

The real-time data 110 may also be configured in any suitable manner and may comprise unprocessed radar imaging data or data that has been subjected to preprocessing steps, such as image or track discrimination. The real-time data 110 may comprise either analog or digital data. The real-time data 110 may also comprise unique time stamp information relating to the time when the real-time data 110 was initially generated by the real-time data source 104.

For testing purposes, the real-time data 110 may be generated by any suitable method or process. For example, a projectile 102 may be fired towards a target while the real-time data source 104 generates the real-time data 110 during projectile 102 flight. The real-time data 110 may then comprise information such as when the projectile was fired, the velocity and acceleration of the projectile during flight, the directional components of the projectile in relation to the real-time data source 104 during flight, and the amount of time elapsed during flight of the projectile. In another embodiment, the real-time data source 104 may be the target and the real-time data 110 collected may include projectile tracking data in addition to estimates of time of impact or potential points of intercept.

The real-time system 106 receives the real-time data 110 and processes the raw data into a form used by the software package. The real-time system 106 may comprise any suitable system for receiving, processing, and saving data. For example, the real-time system 106 may comprise a signal processor 114, a memory module 116, and a real-time system processor 118. The real-time system 106 may comprise a system as simple as a dedicated processor and a memory module or the real-time system 106 may be integrated into preexisting systems or computers such as a tracking computer or the real-time data source 104 itself. The real-time system 106 may further be implemented entirely or partially through software stored in memory and executed by the processor, and/or may be implemented entirely or partially via hardware.

The memory module 116 stores the output from the signal processor 114. The memory module may comprise any suitable system for storing data such as volatile or non-volatile memory. In one embodiment, the memory module 116 may comprise random access memory suitably configured to store a processed real-time data signal 112 from the signal processor 114. In another embodiment, the memory module 116 may be further configured to send and receive the processed real-time data signal 112 to the test computer 108. For example, in the present embodiment, the memory module 116 may be configured to save the processed real-time data signal 112, transfer the processed real-time data signal 112 to the test computer 108, and receive the processed real-time data signal 112 prior to the running of a software test.

The signal processor 114 converts projectile 102 data produced by the real-time data source 104 from one form into another. The signal processor 114 may comprise any suitable system for processing, digitizing, or converting data. For example, the signal processor 114 may comprise an integrated circuit card assembly capable of converting the real-time data 110 signal from an analog signal into a digital signal suitably structured for analysis and/or processing by the real-time system processor 118.

Figure 2:
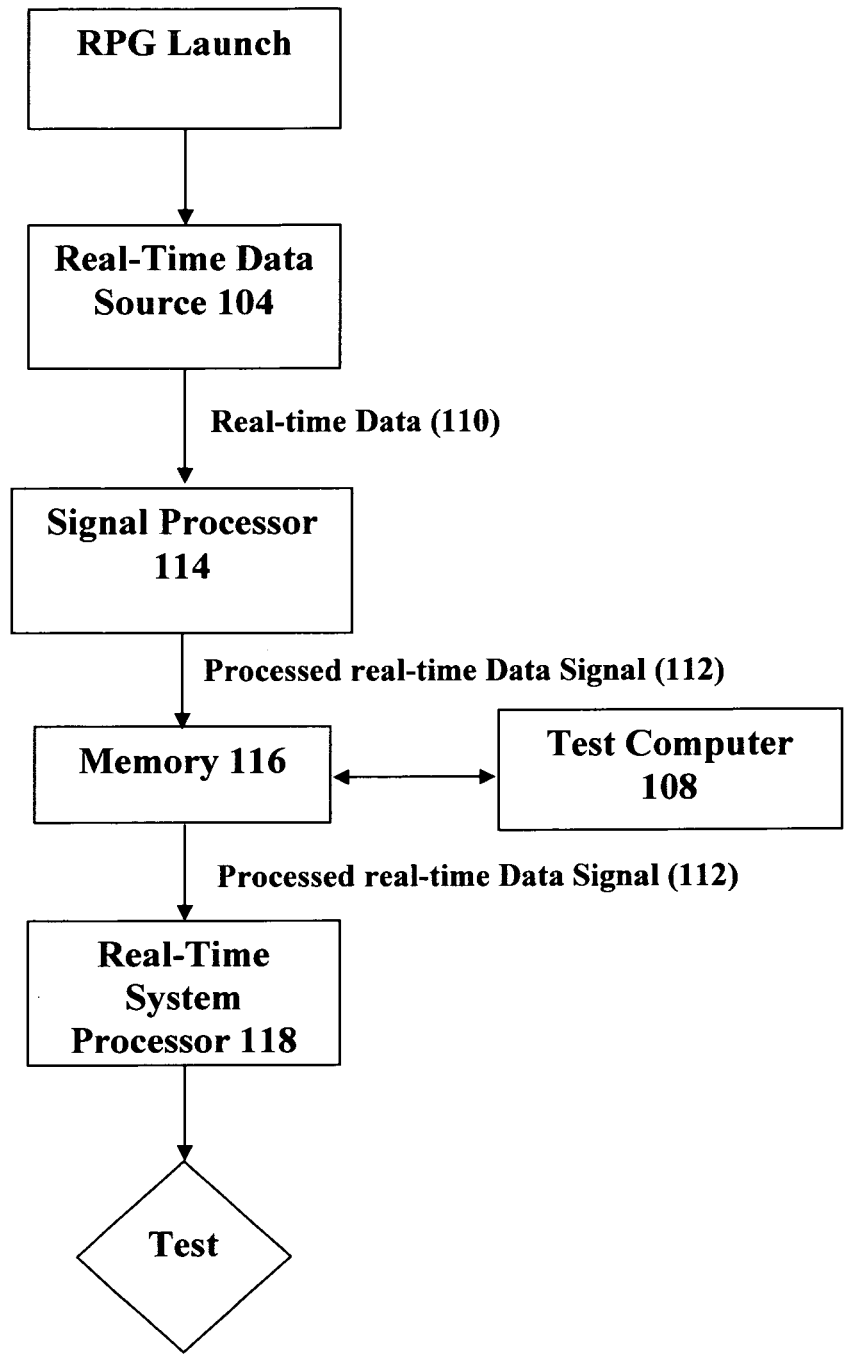
FIG. 2 is a block diagram of a real-time test in accordance with an exemplary embodiment of the present invention.

Referring now to FIG. 2, in one embodiment, the signal processor 114 may be configured to receive the real-time data 110 directly from the real-time data source 104. The real-time data 110 may be sent from the real-time data source 104 to the signal processor 114 by any suitable method such as through a high speed data cable such as RS-422, RS-232, or coaxial cabling, over a wireless connection, or through an integrated circuit. The real-time data 110 may then be processed or converted from one form into another, such as through an analog-to-digital converter, and then stored in memory or passed on to the real-time system processor 118 for testing. For example, the signal processor converts the real-time data 110 into the processed real-time digital signal 112. The processed real-time data signal 112 may be stored as an array of complex numbers representative of raw digitized radar data.

The processed real-time data signal 112 may be stored or saved by any suitable method or process. In one embodiment for example, the processed real-time data signal 112 may be saved to a temporary memory such as RAM and immediately transferred to the real-time system processor 118 for testing. Following the software test, the processed real-time data signal 112 may be written from RAM to the test computer 108 in any form of permanent memory such as a hard disk drive, a CD-ROM, a DVD-ROM, or the like. In another embodiment, the processed real-time data signal 112 may be written to memory and transferred to the real-time system processor 118 substantially simultaneously. In another embodiment, the processed real-time data signal 112 may be permanently stored to the test computer 108 without forwarding it to the real-time system processor 118.

Figure 3:
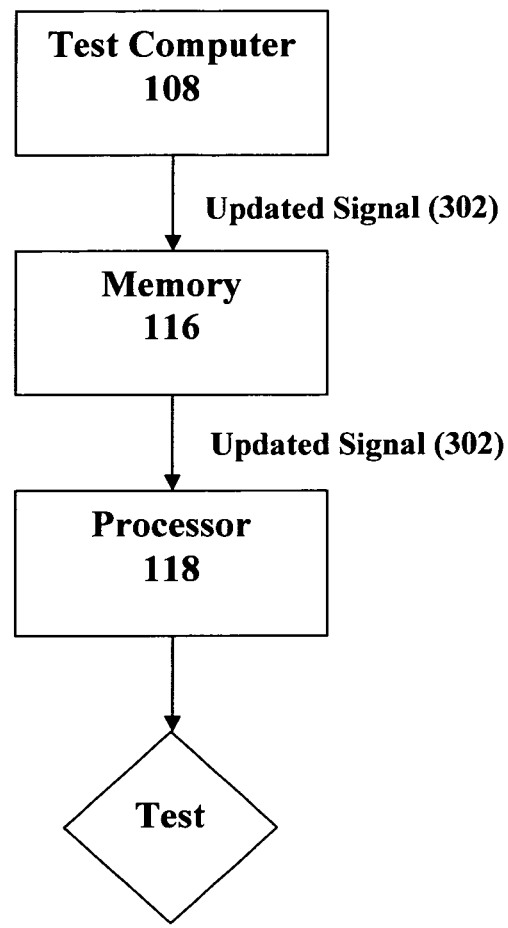
FIG. 3 is a block diagram of a real-time test performed with saved data in accordance with an exemplary embodiment of the present invention.

After the processed real-time data signal 112 has been saved to a permanent storage medium, it may then be used repeatedly in place of new real-time data 110 to test changes or modifications to the software code. Referring now to FIG. 3, rather than generating new real-time data 110, the processed real-time data signal 112 may be modified and used to test software at any time. For example, the test computer 108 may modify the processed real-time data signal 112 to appear as though it were generated in real-time. This updated signal 302 is then transferred to the memory module 116 of the real-time system 106. The updated data signal 302 is then sent to the real-time system processor 118 where it is treated as though it were newly generated real-time data 110. Software may then be tested without the necessity of repeated projectile 102 launches.

Modification of the processed real-time data signal 112 may be accomplished by updating or adjusting the time stamps associated with the processed real-time data signal 112 that were created when the data was originally generated by the real-time data source 104. Data pertaining to or dependent on time may be stored at known locations within an array of numbers. The test computer 108 may then be configured to overwrite these data locations with values reflective of the time when the software test is being run. For example, if part of the real-time data 110 contained information associated with the time and date when the source information was generated, that information may be updated to reflect the current time and date at the instant the test is begun.

The test computer 108 provides commands to the real-time system 106 during testing. The test computer 108 may comprise any suitable system for controlling the real-time system 106 such as a bench tester, a replicator, or computer. For example, in one embodiment, the test computer 108 may comprise a PC configured to command the real-time system 106 to save the real-time data 110 to temporary memory prior to transferring the processed real-time data signal 112 to the test computer 108 for permanent storage. The test computer 108 may be further configured to reload the saved processed real-time data signal 112 to the memory module 116 prior to conducting a software test.

The test computer 108 may also be configured with a user interface suitably adapted to facilitate modification of the processed real-time data signal 112. The user interface may comprise any suitable system for allowing personnel such as a test engineer to manually interact with the signal processor. The user interface may comprise a graphic user interface responsive to an input device such as a keyboard or a mouse, a touch screen, or the like.

In another embodiment, the test computer 108 may comprise a simulator and be configured to perform a software test using the saved processed real-time data signal 212 without uploading the updated signal 302 to the real-time system 106. The test computer 108 may be configured to use the processed real-time data signal 212 to test output characteristics of the real-time system 106 by testing software saved on the test computer 108. By simulating the real-time system 106, the test computer 108 may be used to test software in both a software only environment or in a combined hardware/software environment.

In the foregoing specification, the invention has been described with reference to specific exemplary embodiments. Various modifications and changes may be made without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described.

For example, the steps recited in any method or process claims may be executed in any appropriate order and are not limited to the specific order presented in the claims. Additionally, the components and/or elements recited in any apparatus claims may be assembled or otherwise operationally configured in a variety of permutations and are accordingly not limited to the specific configuration recited in the specification and shown in the drawings.

Benefits, advantages, and solutions to problems have been described above with regard to particular embodiments. Any benefit, advantage, solution to problem or any element that may cause any particular benefit, advantage or solution to occur or to become more pronounced are not to be construed as critical, required or essential features or components of any or all the claims.

As used in this description, the terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the invention.

The invention claimed is:

1. A computer-implemented method for testing software by simulating a real-time environment, comprising:
receiving an input signal from a real-time data source during a first software test at a first time, wherein the input signal comprises real-time data acquired by the real-time data source from a projectile during flight and the input signal is assigned a first time stamp associated with the first software test, and wherein the real-time data includes the time the projectile was fired and the amount of time elapsed during flight of the projectile;
saving the input signal to a recordable medium for storage; and
supplying the saved input signal to a real-time system during a second software test at a second time later than the first time, wherein the saved input signal is to be used in place of real-time data from the real-time data source, wherein the supplying includes changing the first time stamp of the input signal to a second time stamp associated with the second software test to appear as though the saved input signal has been generated in real-time during the second software test.

2. The computer-implemented method according to claim 1, wherein the input signal comprises radar image data of the projectile.

3. The computer-implemented method according to claim 1, wherein the input signal is to be converted from an analog signal to a digital signal.

4. The computer-implemented method according to claim 1, wherein the real-time data source comprises a projectile tracking system separate from the projectile.

5. The computer-implemented method according to claim 1, wherein the real-time data source comprises a target for the projectile.

6. A computer system for testing software in a real-time environment, wherein the computer system is configured to:
process an input signal coming from an real-time data source during a first software test at a first time, wherein the input signal comprises real-time data acquired by the real-time data source from a projectile during flight and the input signal is assigned a first time stamp associated with the first software test, and wherein the real-time data includes the time the projectile was fired and the amount of time elapsed during flight of the projectile;
save the processed input signal to a storage medium; and
transmit the saved input signal to a real-time system during a second software test at a second time later than the first time, wherein the saved input signal is to be supplied to the real-time system in place of real-time data from the real-time data source, wherein the transmitting includes changing the first time stamp of the input signal to reflect a second time stamp associated with the second software test to appear as though the saved input signal has been generated in real-time during the second software test.

7. The computer system according to claim 6, wherein the input signal comprises radar image data of the projectile.

8. The computer system according to claim 6, wherein processing the input signal comprises converting the input signal from an analog signal to a digital signal.

9. The computer system according to claim 6, wherein the real-time data source comprises a projectile tracking system separate from the projectile.

10. The computer system according to claim 6, wherein the real-time data source comprises a target for the projectile.

11. A non-transitory computer readable medium storing instructions executable by a computer, wherein the instructions cause the computer to execute a method for testing software in a real-time environment comprising:
receiving an input signal from a real-time data source during a first software test at a first time, wherein the input signal comprises real-time data acquired by the real-time data source from a projectile during flight and the input signal is assigned a first time stamp associated with the first software test, and wherein the real-time data includes the time the projectile was fired and the amount of time elapsed during flight of the projectile;
saving the input signal to a recordable medium for storage; and
supplying the saved input signal to a real-time system during a second software test at a second time later than the first time, wherein the saved input signal is to be used in place of real-time data from the real-time data source, wherein the supplying includes changing the first time stamp of the input signal to a second time stamp associated with the second software test to appear as though the saved input signal has been generated in real-time during the second software test.

12. The non-transitory computer readable medium according to claim 11, wherein the receiving of the input signal comprises converting the input signal from an analog signal into a digital signal.

13. The non-transitory computer readable medium according to claim 11, wherein the input signal comprises radar image data of the projectile.

* * * * *